United States Patent [19]

Shoji et al.

[11] Patent Number: 5,071,715
[45] Date of Patent: Dec. 10, 1991

[54] MAGNETIC RECORDING MEDIUM WITH A LUBRICANT LAYER CONTAINING A PERFLUORO POLYOXYALKYL COMPOUND

[75] Inventors: Mitsuyoshi Shoji, Ibaraki; Yutaka Ito, Takahagi; Fumio Nakano, Hitachi; Toshikazu Narahara, Ibaraki, all of Japan

[73] Assignee: Hitachi, Ltd., Tokyo, Japan

[21] Appl. No.: 308,781

[22] Filed: Feb. 9, 1989

Related U.S. Application Data

[63] Continuation-in-part of Ser. No. 10,740, Feb. 4, 1987, abandoned.

[51] Int. Cl.$^5$ .............................................. G11B 23/00
[52] U.S. Cl. ........................................ 428/694; 428/695; 428/900; 252/52 A
[58] Field of Search ....................... 428/900, 695, 694

[56] References Cited

U.S. PATENT DOCUMENTS

| | | | |
|---|---|---|---|
| 4,120,995 | 10/1978 | Phipps et al. | 427/248 A |
| 4,267,238 | 5/1981 | Chernega | 428/422 |
| 4,268,556 | 5/1981 | Pedrotty | 428/65 |
| 4,368,239 | 1/1983 | Nakajima et al. | 428/421 |
| 4,526,836 | 7/1985 | Mukai et al. | 428/421 |
| 4,529,659 | 7/1985 | Hoshino et al. | 428/422 |
| 4,583,145 | 4/1986 | Mönnich et al. | 360/135 |
| 4,692,378 | 9/1987 | Ishihara et al. | 428/340 |
| 4,696,845 | 9/1987 | Yanagisawa | 428/64 |
| 4,757,145 | 7/1988 | Caporiccio et al. | 546/81 |
| 4,828,924 | 5/1989 | Shoji et al. | 428/422 |

Primary Examiner—Merrell C. Cashion, Jr.
Assistant Examiner—Stevan A. Resan
Attorney, Agent, or Firm—Antonelli, Terry, Stout & Kraus

[57] ABSTRACT

A magnetic recording medium comprising a non-magnetic substrate and a magnetic layer formed thereon, at least the surface portion of said magnetic layer being made from an organic compound having a perfluoro group and a hydrocarbon containing group is excellent in durability and exhibits good lubricating effect for a long period of time.

8 Claims, 3 Drawing Sheets

MAGNETIC RECORDING MEDIUM WITH A LUBRICANT LAYER CONTAINING A PERFLUORO POLYOXYALKYL COMPOUND

RELATED APPLICATIONS

This is a continuation-in-part of U.S. patent application Ser. No. 07/010,740 filed Feb. 4, 1987, now abandoned.

BACKGROUND OF THE INVENTION

This invention relates to a magnetic recording medium having an organic coating as a sliding surface, particularly to a magnetic recording medium having excellent durability.

Magnetic recording media have been widely used in a variety of fields as media for a large capacity information recording and reproducing apparatus. There are magnetic tapes as recording media for voices, communications, etc.; floppy disks as digital signal recording apparatus; hard disk media as peripheral recording apparatus for large-scale computers; etc. These recording media are expected to increase in their recording capacities and at the same time required to have reliability bearable for long time operation.

In the case of magnetic recording media, information is usually written and read out while conducting sliding with a head. In a special case, there is employed an apparatus wherein a medium and a head do not slide and information is written and read out while maintaining a very narrow, constant distance between the medium and the head. In this case, it is admitted that the head and the medium are subjected to a contact sliding with a certain probability.

An increase of recording capacity inevitably makes the sliding conditions severe and thus the improvement in durability is an essential requirement. There has been obtained no medium having sufficient durability.

In order to improve the durability, it is proposed to use a lubricant for reducing friction and wear at the time of sliding. For example, a long-chain fatty acid derivative such as oleic acid or stearic acid as a lubricant is impregnated into a magnetic recording medium layer. This method is mainly used for a so-called coating medium wherein a mixture of magnetic particles and a binder is coated on a support member. But, since the lubricant gradually flies off from the surface, it is difficult to expect lubricating properties for a long period of time.

In order to improve such a disadvantage, it is proposed a process for coating a fluorine series lubricant which is more excellent in lubricating properties on a disk surface. According to this process, a sufficient effect can be obtained at an initial stage, but the lubricant is peeled off when, used for a long period of time, resulting in undesirably reducing the effect.

On the other hand, in order to prevent the peeling of the lubricant at an initial stage, it is proposed to fix a fluorine series lubricant on the surface of the medium (U.S. Pat. No. 4,120,995). The fluorine series lubricating compound is represented by the formula:

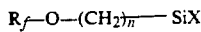

$$R_f\text{—O—}(CH_2)_n\text{—SiX}$$

wherein $R_f$ is a perfluoroalkyl group; n is an integer from 2 to 10; and X is halogen, cyanide or alkoxy group, and is a lubricant which reacts with a metal film surface or oxide film surface, followed by fixation. According to the process for fixing the fluorine series lubricant represented by the formula mentioned above on the magnetic layer surface, since the reaction system is on the solid surface, the reaction is difficult, and it is difficult to obtain a uniform reaction film and very difficult to apply such a process to a practical production line. Further, since the molecular weight of the fluorine chain is too small to exhibit a lubricating effect, the durability of the magnetic layer is not improved sufficiently.

SUMMARY OF THE INVENTION

It is an object of this invention to provide a magnetic recording medium improved in reliability and having a magnetic coating film having durability for a long period of time.

This invention provides a magnetic recording medium comprising
(a) a non-magnetic substrate,
(b) a magnetic layer formed on said substrate, and
(c) a lubricating surface layer provided on said magnetic layer and comprising a film of an organic binder including a lubricating agent, said lubricating agent being an organic compound having a perfluoro polyoxyalkyl group and a hydrocarbon containing group, said hydrocarbon containing group being dissolved in or mixed with said organic binder and said perfluoro polyoxyalkyl group being selectively exposed on a surface of said film of organic binder.

This invention also provides a magnetic head-magnetic recording medium assembly, which comprises
(I) a magnetic recording medium comprising
(a) a non-magnetic substrate,
(b) a magnetic layer formed on said substrate, and
(c) a lubricating layer provided on said magnetic layer and comprising a film of an organic binder including a lubricating agent, said lubricating agent being an organic compound having a perfluoro polyoxyalkyl group and a hydrocarbon containing group, said hydrocarbon containing group being dissolved in or mixed with said organic binder and said perfluoro polyoxyalkyl group being selectively exposed on a surface of said film of organic binder,
(II) a magnetic head having a slidable magnetic tip for recording information into and reading information out from said recording medium, and
(III) a means for driving said recording medium relative to said magnetic head so as to carry out the recording and reading out of the information.

DESCRIPTION OF THE PREFERRED EMBODIMENTS

Figure 1:
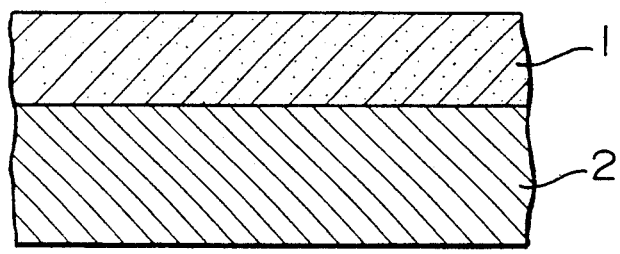
FIGS. 1 and 2 are cross-sectional views of magnetic medium surfaces of coating type and continuous thin film type magnetic disks.

As the non-magnetic substrate, there can be used a conventionally used one. Among them, continuous and self-supporting ones are preferable.

As the magnetic layer formed on the substrate, there can be used a magnetic metal or metal oxide thin layer or a coating layer comprising magnetic particles, a polymer binder and an organic compound having a perfluoro group and a hydrocarbon containing group, said hydrocarbon containing group being dissolved in or mixed with (or connected to or fused in) the polymeric binder.

As the magnetic layer, a continuous, and if necessary self-supporting layer is preferable. It is also preferable that the magnetic layer is made of a continuous and homogenious magnetic material formed on the substrate and having information stored therein in the form of magnetic information.

The magnetic metal or metal oxide layer can be prepared by a conventional vapor deposition, sputtering or plating method.

One feature of the present invention is that at least the surface portion of the magnetic recording medium is made from an organic compound having a perfluoro group and a hydrocarbon containing group (hereinafter referred to as "fluorine-containing organic compound" or "perfluoro compound") connected to or fused in, or miscible with, or adsorbed in a polymeric binder contained in the magnetic layer or in a lubricating surface layer formed on the magnetic layer in order to improve sliding durability.

In order to enhance the sliding durability of the medium, it is necessary to place on the surface a lubricant which can reduce a friction coefficient and reduce a wear rate. The reaction type fluorine series lubricant of the prior art has disadvantages in that the fixing method is very difficult and the sliding durability is insufficient. But according to this invention, the fixing of the coating layer (lubricating surface layer) on the surface of the magnetic recording medium can be carried out easily by forming the coating layer by mixing an effective component of a fluorine-containing organic compound with a polymeric binder, and if necessary, magnetic particles.

Examples of the effective components, i.e. the perfluoro and hydrocarbon groups, are as follows:

a perfluopolyether group of the formula:

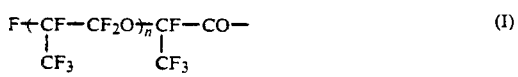

wherein n is an integer of 1 to 50, preferably 5 to 30, a group obtained by bonding linearly a perfluoropolyether group and a polyether group and represented by the formula:

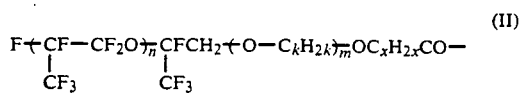

wherein n is as defined above; m is an integer of 1 to 50, preferably 5 to 20; k is an integer of 1 to 10, preferably 2 to 3; x is an integer of 1 to 10, preferably 2 to 3, a group of the formula:

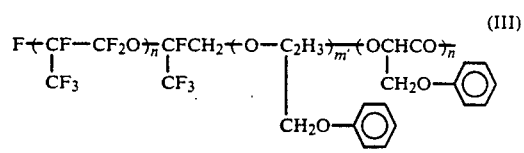

wherein n is as defined above; and m' is an integer of 1 to 50, preferably 3 to 30, compounds obtained by bonding linearly a perfluoropolyether group and a phenylether group and represented by the formula:

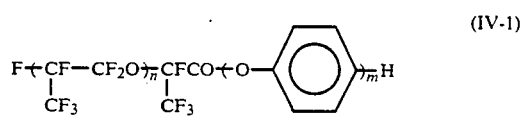

wherein m and n are as defined above,

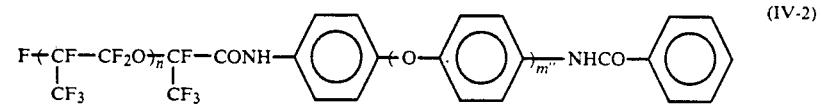

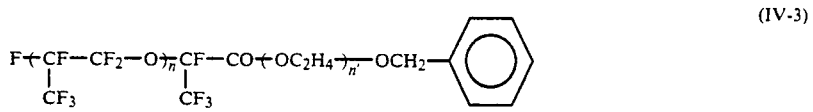

wherein m" is an integer of 1 to 5; and n' is an integar of 1 to 30, preferably 3 to 10.

These fluorine-containing groups can be introduced into polymers as follows:

One method comprises producing an acid chloride containing one of the above-mentioned group, and mixing therewith a reactive polymeric material containing active groups reactive with the acid chloride to complete the reaction. Examples of the active groups reactive with the acid chloride are a hydroxyl group containing active hydrogen, an amine group, and the like. Polymeric materials containing these groups at terminals or side chains can be used in this invention.

Another method for introducing these perfluoro groups into polymeric materials is to mix a fluorine-containing organic compound including one of these groups with a polymeric material (or a polymeric binder).

As the polymeric material (used as the polymeric binder), it is preferable to use those having high heat resistance and which are difficult to wear away. Examples of the polymeric materials are polyimides, polyetheramide series resins, phenol resins, epoxy resins, polyurethanes, polyacrylic resins and polyvinyl butyrals. These polymers can be used alone or as complexes thereof or as copolymers thereof.

Among the fluorine-containing organic compounds, those having high heat resistance and which are difficult to wear away are preferred.

Preferable fluorine-containing organic compounds are represented by the formula:

   (V)

or

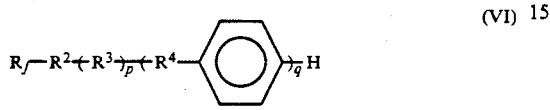   (VI)

wherein $R_f$ is a perfluoro polyoxyalkyl (or perfluoro polyether) group having preferably 5 to 152 carbon atoms, more preferably 17 to 92 carbon atoms; X is a halogen atom such as chlorine, bromine, iodine, or fluorine; A is a group represented by the formula:

   (VII)

R is an oxyalkylene group having 2 to 3 carbon atoms or a substituted oxyalkylene group, e.g. an oxyalkylene group substituted with an alkyl group, phenoxy group, alkylphenoxy group, etc., such as phenoxy-methyl, phenoxyethyl, etc.; $R^1$ is hydrogen, $CH_3$

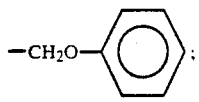

m' is an integer of 1 to 50, preferably 3 to 30; $R^2$ is $-CH_2-$ or -CO-, or may be omitted; $R^3$ is an oxyalkylene group; p is zero or an integer of 1 to 20, preferably 1 to 10; $R^4$ is -COO- , -CONH- , $-CH_2-O-$ , -O-, $-O-CH_2-$ ,

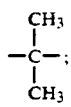

Among the compounds of the formula (VI), preferred ones have a group of the formula: -CONH- , -O- or -COO- as $R^4$.

A poly(amic acid) which is a precursor of a polyimide is a preferred example and a solution thereof is mixed with the above-mentioned fluorine-containing organic compound in a suitable amount. The resulting mixture is mixed with a magnetic coating, coated on a disk, subjected to a heat treatment and fixing of perfluoropolyether groups in a polyimide coating film is carried out.

As a result, the perfluoro polyoxyalkyl or perfluoropolyether groups are selectively exposed on the surface of the medium and function as a lubricating group (or agent). By taking such a structure, no transfer of the lubricant component to a head takes place and the lubricating properties can be maintained for a long period of time.

The magnetic recording medium of this invention can be produced, for example, as follows:

(A) The organic compound having a perfluoro group and a hydrocarbon containing group is mixed with a binder component in a coating type medium containing magnetic particles and the perfluoro groups are fixed on the surface of the coating type medium (the structure of FIG. 1).

Figure 2:
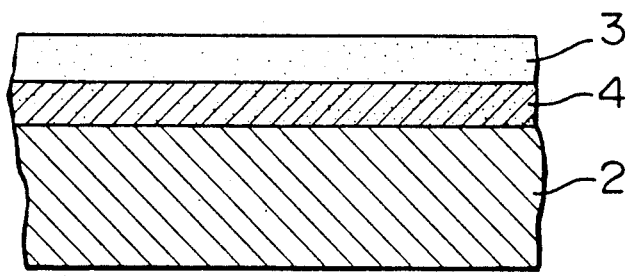

(B) On the surface of a magnetic continuous thin layer obtained by vapor depositing, sputtering or plating a conventional magnetic metal or magnetic metal oxide, a polymeric material film containing an organic compound having a perfluoro group and a hydrocarbon containing group is formed and the perfluoro groups are fixed on the surface thereof (the structure of FIG. 2).

Figure 3:
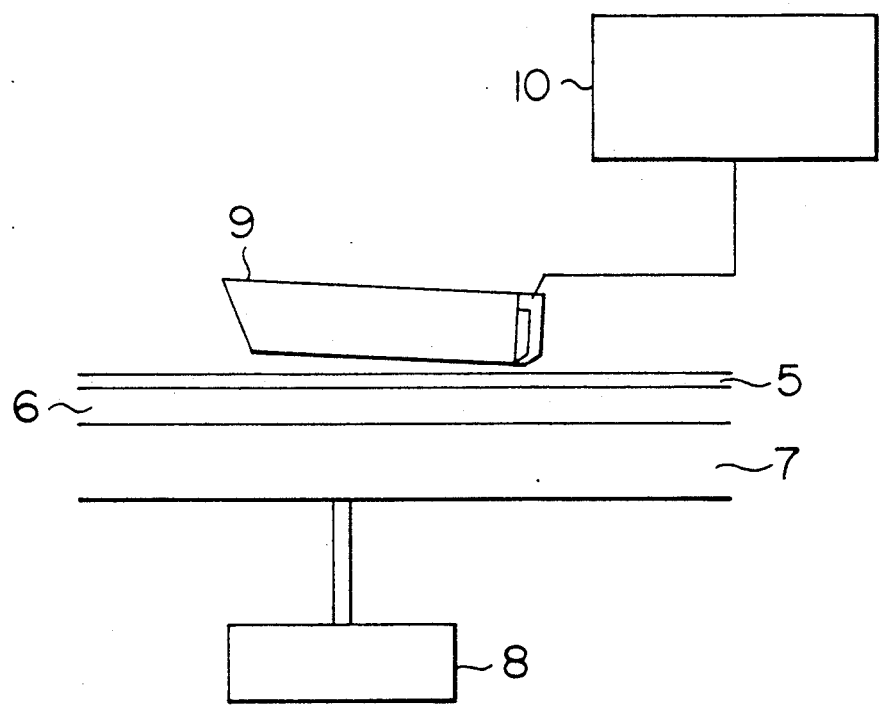
FIG. 3 is a schematic diagram showing one example of the magnetic head-magnetic recording medium assembly according to this invention.

(C) On the magnetic coating film 1 in FIG. 1 or the magnetic continuous thin layer 4 in FIG. 2, a lubricating surface layer containing the organic compound having a perfluoro group and a hydrocarbon containing group (a perfluoro compound layer 5 in FIG. 3) is formed (the structure of FIG. 3).

FIGS. 1 and 2 are cross-sectional views of coating type and continuous thin film type magnetic disks wherein numeral 1 denotes a magnetic coating film (a layer containing a perfluoro compound), numeral 2 an aluminum substrate, numeral 3 a lubricating surface layer (a layer containing a perfluoro compound), and numeral 4 a magnetic continuous thin layer.

In this case, the magnetic film may be either a coating type or a continuous thin film type.

In FIG. 3, numeral 5 is the perfluoro compound layer, numeral 6 a magnetic (continuous thin) layer, numeral 7 a disk substrate made of, e.g. aluminum, numeral 8 a motor, numeral 9 a head and numeral 10 a signal reading and writing apparatus.

In the above-mentioned structures, the organic compound having a perfluoro group and a hydrocarbon containing group (i.e. the perfluoro compound) plays an important role for giving a lubricating surface and bonding to the magnetic thin layer or the magnetic coating film. More precisely, as to the bonding state, the hydrocarbon containing groups of the perfluoro compound are (i) connected to or fused in (or dissolved in or mixed with) the polymeric binder, (ii) adsorbed in the polymeric binder, or (iii) miscible with the polymeric binder, which is contained in the magnetic layer or the lubricating surface layer.

This invention is illustrated by way of the following Examples.

EXAMPLES 1 to 7

After completely dissolving 57 g (0.525 mole) of sufficiently dehydrated p-phenylenediamine in 1000 g of N-methyl-2-pyrrolidone, 147 g (0.50 mole) of 3,3',4,4'-biphenyltetracarboxylic acid dianhydride was added thereto. The resulting mixture was sufficiently stirred to yield a solution [A] of poly(amic acid) having repeating units of the formula:

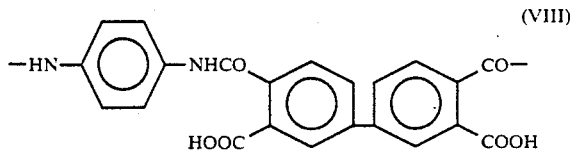   (VIII)

Then, 0.05 mole of a fluorine-containing organic compound listed in Table 1 was added to the poly(amic acid) solution [A] to prepare a solution [B] with uniform stirring.

TABLE 1

| Compound No. | Fluorine-containing organic compound |
|---|---|
| 1 | F(CF(CF$_3$)—CF$_2$—O—)$_{14}$—CF(CF$_3$)—CH$_2$—(OC$_2$H$_4$)$_5$—O—CH$_2$COCl |
| 2 | F(CF(CF$_3$)—CF$_2$—O—)$_{26}$—CF(CF$_3$)—CH$_2$—(OC$_3$H$_6$)$_8$—O—C$_2$H$_4$COCl |
| 3 | F(CF(CF$_3$)—CF$_2$—O—)$_{14}$—CF(CF$_3$)—CH$_2$—(OC$_2$H$_3$(CH$_2$O-C$_6$H$_5$))$_8$—O—CH(CH$_2$O-C$_6$H$_5$)COCl |
| 4 | F(CF(CF$_3$)—CF$_2$—O—)$_7$—CF(CF$_3$)—COO—C$_6$H$_5$ |
| 5 | F(CF(CF$_3$)—CF$_2$—O—)$_{14}$—CF(CF$_3$)—COO—C$_6$H$_4$—O—C$_6$H$_5$ |
| 6 | F(CF(CF$_3$)—CF$_2$—O—)$_{14}$—CF(CF$_3$)—COO—C$_6$H$_4$—O—C$_6$H$_4$—O—C$_6$H$_5$ |
| 7 | F(CF(CF$_3$)—CF$_2$—O—)$_{14}$—CF(CF$_3$)—CONH—C$_6$H$_4$—O—C$_6$H$_4$—O—C$_6$H$_4$—NHCO—C$_6$H$_5$ |

As a result, an acid chloride type fluorine-containing compound was reached with amino groups of the poly-(amic acid) and bonded through a group of the formula: -CONH- Unreacted fluorine-containing compound was simply mixed with the poly(amic acid) solution. Then, the solution [B] was distilled in vacuum.

On the other hand, a magnetic thin film (0.2 μm thick) of an alloy of Co-Ni (Co/Ni=4/1 in weight ratio) was formed on a surface of an aluminum substrate by vapor deposition. On the magnetic thin film, the solution [B] was coated in 0.1 μm thick. Then, the solution was cured with heating at 300° C. to form a lubricating surface layer.

Density distribution of the fluorine-containing compound on the surface of the coating film and inner portion of the coating film thus obtained was measured. The measurement was conducted by using XSAM 800 type ESCA (Electron Spectroscopy for Chemical Analysis) manufactured by KRATOS Co., Ltd. under conditions of X-rays source (Mg-K α:12 kV, 12 mA), and scanning (rate :20 eV/min. number of times :30). The measurement of the inner portion of the coating film was conducted after etching the coating film surface in 50 Å thick with Ar plasma.

TABLE 2

| Example No. | Compound No. | Spectral Intensity of ESCA (CPS) | |
|---|---|---|---|
| | | Surface | Inner portion (50 Å) |
| 1 | 1 | 3550 | 0 |
| 2 | 2 | 4800 | 0 |
| 3 | 3 | 5800 | 0 |
| 4 | 4 | 950 | 0 |
| 5 | 5 | 2500 | 0 |
| 6 | 6 | 5200 | 0 |
| 7 | 7 | 5500 | 0 |

Figure 4A:
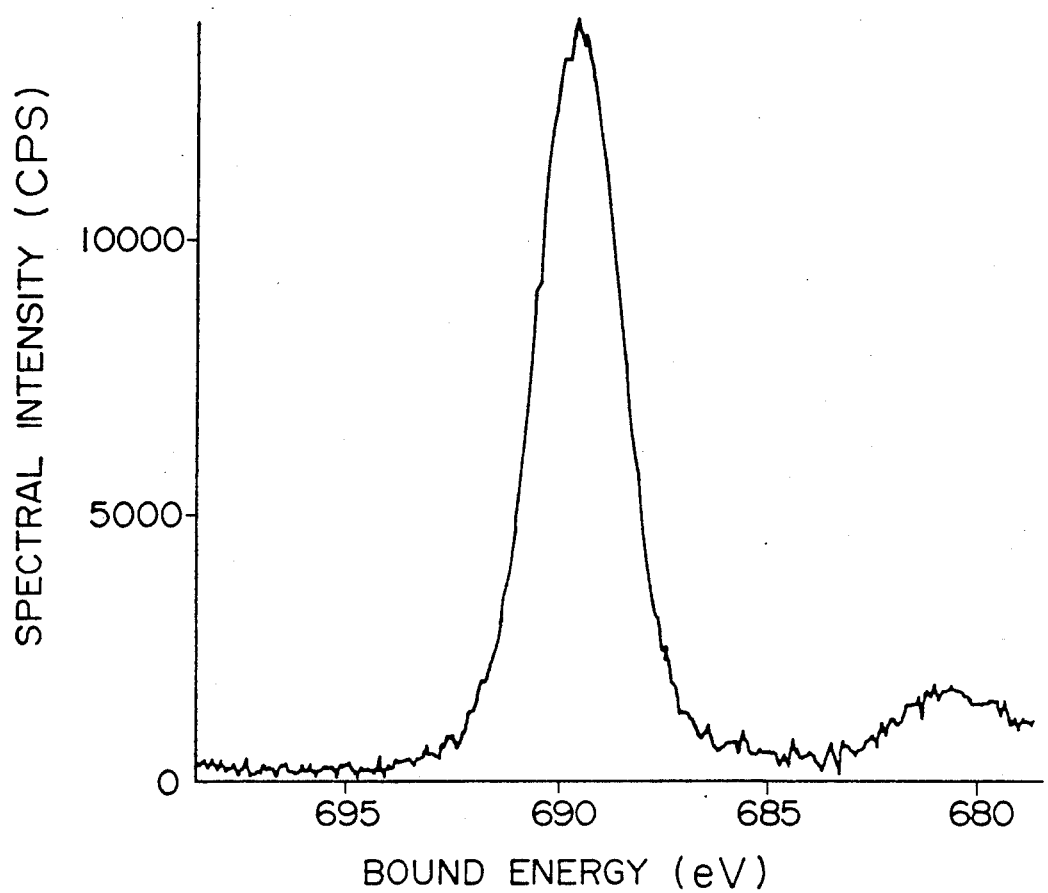
FIGS. 4(a) and 4(b) are fluorine compound concentration distribution charts of surface and inner portions of a fluorine-containing organic compound (compound No. 6)-containing coating film by ESCA (Electron Spectroscopy for Chemical Analysis).
Figure 4B:
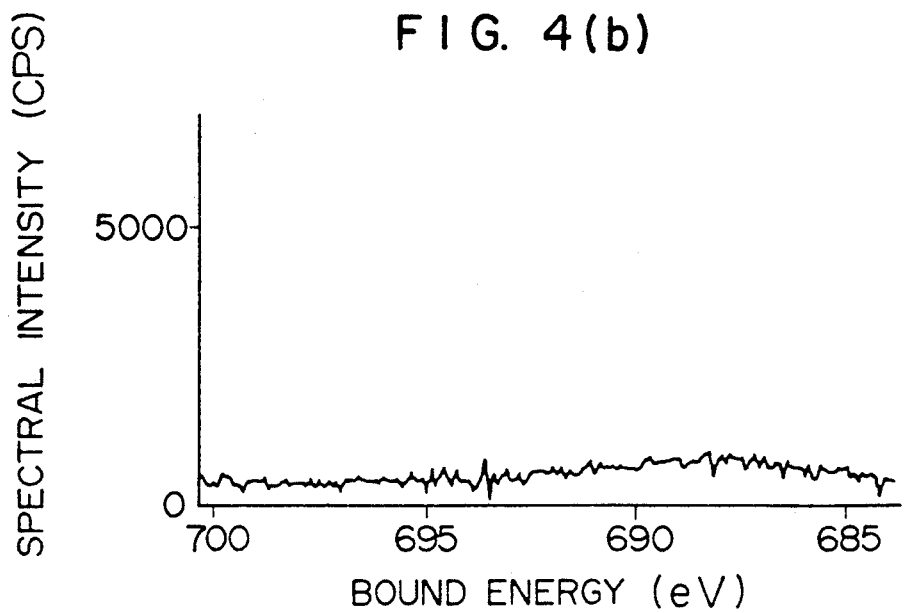

As is clear from Table 2, the spectra of the fluorine-containing compounds are only detected from the surface of the coating films and hardly detected from the inner portion (50 Å) of the coating films. FIG. 4(a) shows the spectral intensity on the surface of the coating film of Example 6 and FIG. 4(b) shows the spectral intensity in the inner portion of the coating film of Example 6. These results show that the fluorine-containing compounds are selectively collected at the surface portion of the coating films.

Further, durability of the thus obtained magnetic thin films was evaluated by using a spherical surface sliding tester. That is, a load of 10 g was charged on a sapphire spherical surface slider, a disk was rotated at a peripheral speed of 10 m/sec, and a total rotating number until a magnetic thin film was broken was counted. The results are shown in Table 3. In Comparative Example 1, Krytox 143 AC (a trade name), which is a fluorine-containing lubricant manufactured by E.I. du Pont de Nemours & Co., was simply coated on a magnetic thin film in place of the solution [B].
Table 3

TABLE 3

| Example No. | Compound No. | Total rotating number until breaking |
| --- | --- | --- |
| 1 | 1 | 84000 |
| 2 | 2 | >92000 |
| 3 | 3 | >92000 |
| 4 | 4 | 8500 |
| 5 | 5 | 75000 |
| 6 | 6 | >92000 |
| 7 | 7 | >92000 |
| Comparative Example 1 | | 700 |

As is clear from Table 3, the lubricating layers of this invention are by far superior in durability to that of Comparative Example 1, since the total rotating numbers until the magnetic thin films are broken are remarkably larger than that of Comparative Example 1.

EXAMPLES 8 to 10

Solution [C] was prepared by dissolving a binder comprising 45 g of a bisphenol type epoxy resin, 40 g of a resol type phenol resin and 15 g of polyvinyl butyral resin in 400 g of cyclohexanone, and dispersing 150 g of magnetic iron oxide ($\gamma$-Fe$_2$O$_3$) particles in the resulting solution by ball milling.

Then, 50 g of a mixture was prepared by mixing equimolar amounts of the resol type phenol resin mentioned above and a fluorine-containing compound listed in Table 1. The resulting mixture was dissolved in 100 parts by weight of cyclohexanone and reacted with heating at 120° C. After distilling in vacuum, a solution [D] was prepared. To the solution [D] in an amount of 5 g, 100 g of the solution [C] was added to prepare a solution [E]. Further, a solution [F] was prepared by dispersing the solution [E] by ball milling.

Then, the solution [F] was coated on an aluminum substrate, the surface of which had been cleaned previously. The magnetic particles in the coating film were oriented according to a conventional method, followed by curing with heating at 300° C.

The durability of the thus obtained magnetic coating film was evaluated by using the spherical surface sliding tester in the same manner as described in Examples 1 to 7.

The results are shown in Table 4. For comparison (Comparative Example 2), Krytox 143 AC (mfd. by E.I. du Pont de Nemours & Co.) was mixed with the solution [C] and ball milled to give a well dispersed solution. The resulting solution was coated on an aluminum substrate in the same manner as mentioned above.
Table 4

TABLE 4

| Example No. | Compound No. | Total rotating number until breaking |
| --- | --- | --- |
| 8 | 1 | >92000 |
| 9 | 2 | >92000 |
| 10 | 6 | >92000 |
| Comparative Example 2 (Krytox 143 AC) | | 20000 |

As is clear from Table 4, the magnetic coating films according to this invention are by far superior in durability to that of Comparative Example 2.

EXAMPLES 11 to 13

Magnetic iron oxide ($\gamma$-Fe$_2$O$_3$) in an amount of 68 g, 26 g of vinyl chloride-vinyl acetate-vinyl alcohol copolymer VABH (a trade name, mfd. by U.C.C. in U.S.A.), 5 g of acrylonitrile-butadiene copolymer N1482J (a trade name, mfd. by The Japanese Geon Co., Ltd.), 2 g of polyisocyanate Colonate L (a trade name, mfd. by Nippon Polyurethane Co., Ltd.), 7 g of carbon black, 75 g of toluene, and 75 g of methyl isobutyl ketone were ball milled to prepare a well dispersed solution [G].

On the other hand, an N-methyl-2-pyrrolidone solution [H] of equimolar reaction product of 2,2-bis[4-(4-aminophenoxy)phenyl]propane and a fluorine-containing compound listed in Table 1 was prepared. Into the ball mill, 30 g of the solution [H] was added additionally and sufficiently dispersed to give a solution [J].

The solution [J] was coated on a disk-like polyester film with 75 $\mu$m thick so as to make the dry thickness of the coating 3 $\mu$m, and dried to form a magnetic coating film.

The durability of the thus formed magnetic coating films was evaluated by using the spherical surface sliding tester in the same manner as described in Examples 1 to 7.

The results are shown in Table 5. For comparison (Comparative Example 3), Krytox 143 AC (mfd. by E.I. du Pont de Nemours & Co.) was coated on a magnetic coating film of 3 $\mu$m thick formed by coating the solution [G] on a disk-like polyester film of 75 $\mu$m thick.

TABLE 5

| Example No. | Compound No. | Total rotating number until breaking |
| --- | --- | --- |
| 11 | 1 | >92000 |
| 12 | 2 | >92000 |
| 13 | 6 | >92000 |
| Comparative Example 3 (Krytox 143 AC) | | 23000 |

As is clear from Table 5, the magnetic coating films according to this invention are by far superior in durability to that of Comparative Example 3.

What is claimed is:

1. A magnetic recording medium comprising:
   (a) a non-magnetic substrate;
   (b) a magnetic layer formed on said substrate; and
   (c) a lubricating layer provided on said magnetic layer and comprising a film of an organic binder including a lubricating agent, said lubricating agent being an organic compound having a perfluoro polyoxyalkyl group and a hydrocarbon containing group, said hydrocarbon containing group being dissolved in or mixed with said organic binder and said perfluoro polyoxyalkyl group being exposed on a surface of said film of organic binder, wherein the organic compound is represented by the formula:

R$_f$-A-CO-X wherein R$_f$ is a perfluoro polyoxyalkyl group; X is a halogen atom; and A is a group represented by the formula:

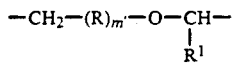

wherein R is an oxyalkylene group having 2 to 3 carbon atoms or a substituted oxyalkylene group; $R^1$ is hydrogen, a methyl group or a phenoxymethyl group; and m' is an integer of 1 to 50.

2. A magnetic recording medium according to claim 1, wherein the polymeric binder is at least one member selected from the group consisting of polyimides, polyetheramides, phenol resins and epoxy resins.

3. A magnetic recording medium comprising:
(a) a non-magnetic substrate;
(b) a continuous, magnetic layer formed on said substrate; and
(c) a lubricating layer provided on said magnetic layer and comprising a film of an organic binder including a lubricating agent, said lubricating agent being an organic compound having a perfluoro polyoxyalkyl group and a hydrocarbon containing group, said hydrocarbon containing group being dissolved in or mixed with said organic binder and said perfluoro polyoxyalkyl group being exposed on a surface of said film of organic binder, wherein the organic compound is represented by the formula:

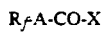

wherein $R_f$ is a perfluoro polyoxyalkyl group; X is a halogen atom; and A is a group represented by the formula:

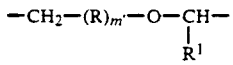

wherein R is an oxyalkylene group having 2 to 3 carbon atoms or a substituted oxyalkylene group; $R^1$ is hydrogen, a methyl group or a phenoxymethyl group; and m' is an integer of 1 to 50.

4. A magnetic recording medium according to claim 3, wherein the polymeric binder is at least one member selected from the group consisting of polyimides, polyetheramides, phenol resins and epoxy resins.

5. A magnetic head-magnetic recording medium assembly, which comprises
(I) a magnetic recording medium comprising
(a) a non-magnetic substrate;
(b) a magnetic layer formed on said substrate; and
(c) a lubricating layer provided on said magnetic layer and comprising a film of an organic binder including a lubricating agent, said lubricating agent being an organic compound having a perfluoro polyoxyalkyl group and a hydrocarbon containing group, said hydrocarbon containing group being dissolved in or mixed with said organic binder and said perfluoro polyoxyalkyl group being exposed on a surface of said film or organic binder, wherein the organic compound is represented by the formula:

wherein $R_f$ is a perfluoro polyoxyalkyl group; X is a halogen atom; and A is a group represented by the formula:

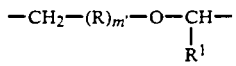

wherein R is an oxyalkylene group having 2 to 3 carbon atoms or a substituted oxyalkylene group; $R^1$ is hydrogen, a methyl group or a phenoxymethyl group; and m' is an integer of 1 to 50

(II) a magnetic head having a slidable magnetic tip for recording information into and reading information out from said recording medium; and (III) a means for driving said recording medium relative to said magnetic head so as to carry out the recording and reading out of the information.

6. A magnetic head-magnetic recording medium assembly according to claim 5, wherein the polymeric binder is at least one member selected from the group consisting of polyimides, polyetheramides, phenol resins and epoxy resins.

7. A magnetic head-magnetic recording medium assembly, which comprises
(I) a magnetic recording medium comprising,
(a) a continuous, self-supporting non-magnetic substrate;
(b) a continuous, magnetic layer formed on said substrate; and
(c) a lubricating layer provided on said magnetic layer and comprising a film of an organic binder including a lubricating agent, said lubricating agent being an organic compound having a perfluoro polyoxyalkyl group and a hydrocarbon containing group, said hydrocarbon containing group being dissolved in or mixed with said organic binder and said perfluoro polyoxyalkyl group being exposed on a surface of said film of organic binder, wherein the organic compound is represented by the formula:

wherein $R_f$ is a perfluoro polyoxyalkyl group; X is a halogen atom; and A is a group represented by the formula:

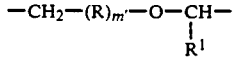

wherein R is an oxyalkylene group having 2 to 3 carbon atoms or a substituted oxyalkylene group; $R^1$ is hydrogen, a methyl group or a phenoxymethyl group; and m' is an integer of 1 to 50;

(II) a magnetic head having a slidable magnetic tip for recording information into and reading information out from said recording medium; and (III) a means for driving said recording medium relative to said magnetic head so as to carry out the recording and reading out of the information.

8. A magnetic head-magnetic recording medium assembly according to claim 7, wherein the polymeric binder is at least one member selected from the group consisting of polyimides, polyetheramides, phenol resins and epoxy resins.

* * * * *